United States Patent [19]
Cash

[11] Patent Number: 5,921,073
[45] Date of Patent: Jul. 13, 1999

[54] GRASS CATCHER

[76] Inventor: Tony R. Cash, 110 Cash La., Statesville, N.C. 28677

[21] Appl. No.: 09/105,435

[22] Filed: Jun. 26, 1998

[51] Int. Cl.[6] .................................................. A01B 35/22
[52] U.S. Cl. ............................................... 56/202; 56/16.6
[58] Field of Search ................................... 56/16.6, 16.8, 56/202, 320.2, 205, 206, 194, 203

[56] References Cited

U.S. PATENT DOCUMENTS

| | | | |
|---|---|---|---|
| 3,757,503 | 9/1973 | Soldavini | 56/202 |
| 4,532,756 | 8/1985 | Merkel | 56/202 |
| 4,736,575 | 4/1988 | Fedeli | 56/202 |
| 4,796,322 | 1/1989 | Steed et al. | 56/16.6 X |
| 4,972,666 | 11/1990 | Peruzzo | 56/206 |
| 5,018,346 | 5/1991 | Ishimaru et al. | 56/202 |

*Primary Examiner*—Thomas B. Will
*Assistant Examiner*—Robert Pezzuto

[57] ABSTRACT

A new grass catcher for mounting to a riding mower to collect mowed grass. The inventive device includes a container member having a front opening of the container member into the interior space of the container member. A front cover panel mountable to a riding lawn mower is provided for substantially covering the front opening of the container member. A support frame assembly pivotally couples the top panel of the container member to the top edge of the front cover panel. The front cover panel has a passage hole therethrough designed for extending one end of a grass chute of a lawn mower therein to permit passage of lawn clipping from the cutting blades of the lawn mover to the interior space of the container member.

6 Claims, 2 Drawing Sheets

GRASS CATCHER

BACKGROUND OF THE INVENTION

1. Field of the Invention

The present invention relates to grass catchers and more particularly pertains to a new grass catcher for mounting to a riding mower to collect mowed grass.

2. Description of the Prior Art

The use of grass catchers is known in the prior art. More specifically, grass catchers heretofore devised and utilized are known to consist basically of familiar, expected and obvious structural configurations, notwithstanding the myriad of designs encompassed by the crowded prior art which have been developed for the fulfillment of countless objectives and requirements.

Known prior art grass catchers include U.S. Pat. No. 4,156,337; U.S. Pat. No. 5,018,346; U.S. Pat. No. 4,532,756; U.S. Pat. No. 4,984,420; U.S. Pat. No. 3,665,846; and U.S. Pat. No. 3,176,453.

While these devices fulfill their respective, particular objectives and requirements, the aforementioned patents do not disclose a new grass catcher. The inventive device includes a container member having a front opening of the container member into the interior space of the container member. A front cover panel mountable to a riding lawn mower is provided for substantially covering the front opening of the container member. A support frame assembly pivotally couples the top panel of the container member to the top edge of the front cover panel. The front cover panel has a passage hole therethrough designed for extending one end of a grass chute of a lawn mower therein to permit passage of lawn clipping from the cutting blades of the lawn mower to the interior space of the container member.

In these respects, the grass catcher according to the present invention substantially departs from the conventional concepts and designs of the prior art, and in so doing provides an apparatus primarily developed for the purpose of mounting to a riding mower to collect mowed grass.

SUMMARY OF THE INVENTION

In view of the foregoing disadvantages inherent in the known types of grass catchers now present in the prior art, the present invention provides a new grass catcher construction wherein the same can be utilized for mounting to a riding mower to collect mowed grass.

The general purpose of the present invention, which will be described subsequently in greater detail, is to provide a new grass catcher apparatus and method which has many of the advantages of the grass catchers mentioned heretofore and many novel features that result in a new grass catcher which is not anticipated, rendered obvious, suggested, or even implied by any of the prior art grass catchers, either alone or in any combination thereof.

To attain this, the present invention generally comprises a container member having a front opening of the container member into the interior space of the container member. A front cover panel mountable to a riding lawn mower is provided for substantially covering the front opening of the container member. A support frame assembly pivotally couples the top panel of the container member to the top edge of the front cover panel. The front cover panel has a passage hole therethrough designed for extending one end of a grass chute of a lawn mower therein to permit passage of lawn clipping from the cutting blades of the lawn mower to the interior space of the container member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grass catcher apparatus and method which has many of the advantages of the grass catchers mentioned heretofore and many novel features that result in a new grass catcher which is not anticipated, rendered obvious, suggested, or even implied by any of the prior art grass catchers, either alone or in any combination thereof.

It is another object of the present invention to provide a new grass catcher which may be easily and efficiently manufactured and marketed.

It is a further object of the present invention to provide a new grass catcher which is of a durable and reliable construction.

An even further object of the present invention is to provide a new grass catcher which is susceptible of a low cost of manufacture with regard to both materials and labor, and which accordingly is then susceptible of low prices of sale to the consuming public, thereby making such grass catcher economically available to the buying public.

Still yet another object of the present invention is to provide a new grass catcher which provides in the apparatuses and methods of the prior art some of the advantages thereof, while simultaneously overcoming some of the disadvantages normally associated therewith.

Still another object of the present invention is to provide a new grass catcher for mounting to a riding mower to collect mowed grass.

Yet another object of the present invention is to provide a new grass catcher which includes a container member having a front opening of the container member into the interior space of the container member. A front cover panel mountable to a riding lawn mower is provided for substantially covering the front opening of the container member. A support frame assembly pivotally couples the top panel of the container member to the top edge of the front cover panel. The front cover panel has a passage hole therethrough designed for extending one end of a grass chute of a lawn mower therein to permit passage of lawn clipping from the cutting blades of the lawn mover to the interior space of the container member.

Still yet another object of the present invention is to provide a new grass catcher that collects grass clipping from a riding lawn mower and is pivotable to permit dumping of the grass clippings from it.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
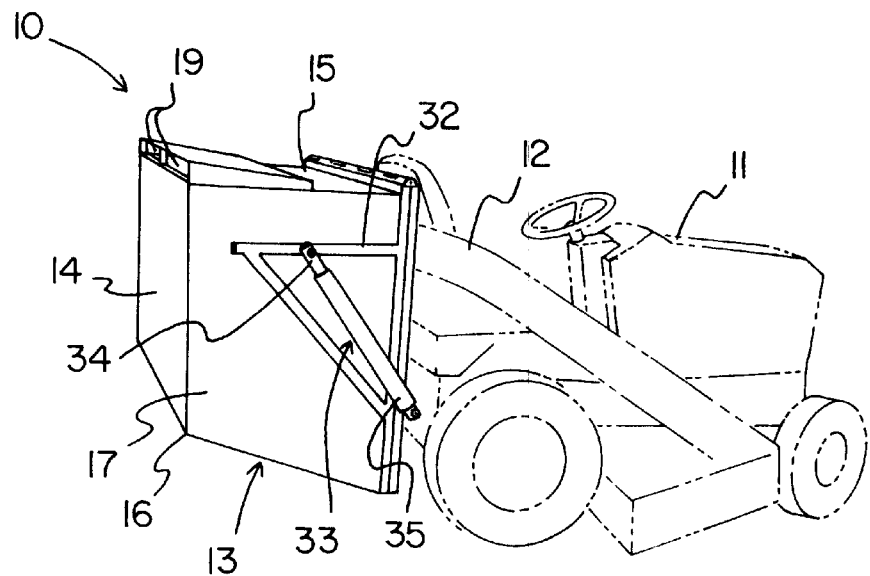
FIG. 1 is a schematic perspective view of a new grass catcher according to the present invention.

With reference now to the drawings, and in particular to FIGS. 1 through 4 thereof, a new grass catcher embodying the principles and concepts of the present invention and generally designated by the reference numeral 10 will be described.

As best illustrated in FIGS. 1 through 4, the grass catcher 10 generally comprises a container member 13 having a front opening of the container member 13 into the interior space of the container member 13. A front cover panel 20 mountable to a riding lawn mower 11 is provided for substantially covering the front opening of the container member 13. A support frame assembly 25,26 pivotally couples the top panel 15 of the container member 13 to the top edge 21 of the front cover panel 20. The front cover panel 20 has a passage hole 36 therethrough designed for extending one end of a grass chute 12 of a lawn mower 11 therein to permit passage of lawn clipping from the cutting blades of the lawn mover to the interior space of the container member 13.

In use, the grass catcher 10 is designed for mounting to the back of a riding lawn mower 11 and connecting to the grass chute 12 of the riding lawn mower 11 to connect the mower deck and cutting blades of the riding lawn mower 11 to the grass catcher. Specifically, the container member 13 has a back panel 14, spaced apart top and bottom panels 15,16 and a pair of spaced apart side panels 17,18. Ideally, the panels of the container member 13 comprise sheet metal. The panels of the container member 13 define an interior space of the container member 13 adapted for holding grass clippings therein. The container member 13 has a front edge extending around the top, bottom, and side panels 17,18 of the container member 13. The front edge of the container member 13 is generally rectangular and defines a front opening of the container member 13 into the interior space of the container member 13. The top panel 15 of the container member 13 preferably has a pair of vents 19 providing openings into the interior space of the container. The vents 19 are positioned adjacent the back panel 14 of the container member 13. Preferably, the vents 19 face in a direction away from (or opposite from) the front opening of the container member 13. Preferably, the bottom panel 16 of the container member 13 lies in a plane extending at an obtuse angle to the plane the back panel 14 lies in. Ideally, the obtuse angle is between about 120 degrees and about 150 degrees.

The generally rectangular front cover panel 20 is designed for substantially covering the front opening of the container member 13. The front cover member has top and bottom edges 21,22, a pair of side edges 23,24, a pair of upper corners and a pair of lower corners. The edges of the front cover panel 20 together define the outer perimeter of the front cover panel 20.

A support frame assembly pivotally couples the top panel 15 of the container member 13 to the top edge 21 of the front cover panel 20. The support frame assembly comprises generally rectangular front and back frames 25,26. The front frame 25 of the support frame assembly is designed for mounting to the back of a riding lawn mower 11. The front and back frames 25,26 of the support frame assembly each have spaced apart top and bottom bars 27,28 and a pair of spaced apart side bars 29,30 extending between the top and bottom bars 27,28 of the associated frame of the support frame assembly. The front frame 25 of the support frame assembly is coupled to the front cover panel 20 such that the front frame 25 extends around the outer perimeter of the front cover panel 20. The back frame 26 of the support frame assembly is coupled to the container member 13. The back frame 26 is extended around and positioned adjacent the front edge of the container member 13 such that the front opening of the container member 13 is positioned inside the perimeter of the back frame 26. The top bars 27 of the front and back frames 25,26 of the support frame assembly are pivotally coupled together by a hinge 31.

Figure 2:
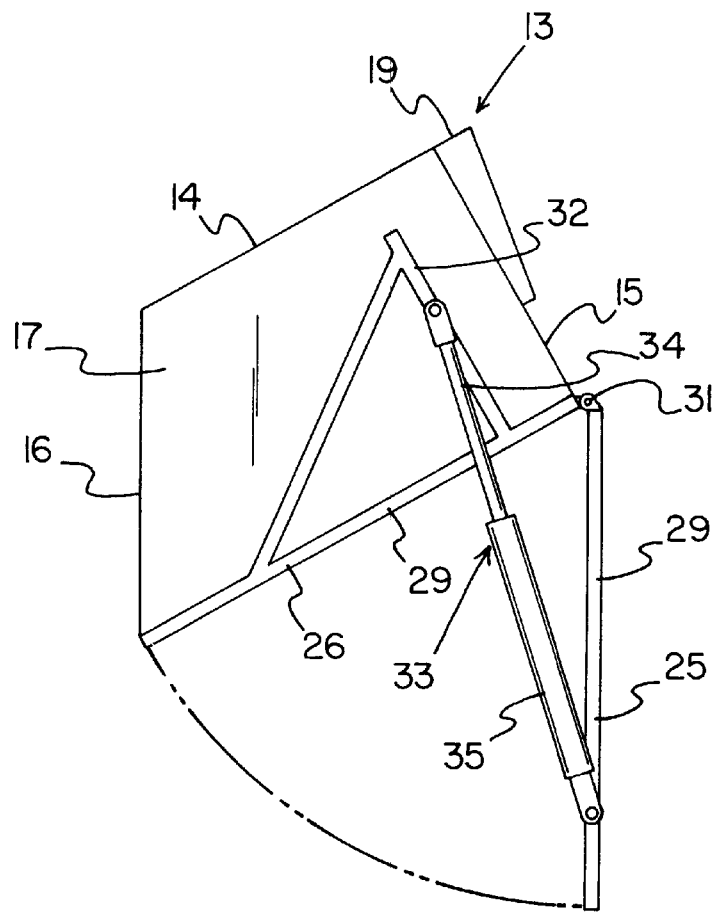
FIG. 2 is a schematic side view of the present invention.
Figure 3:
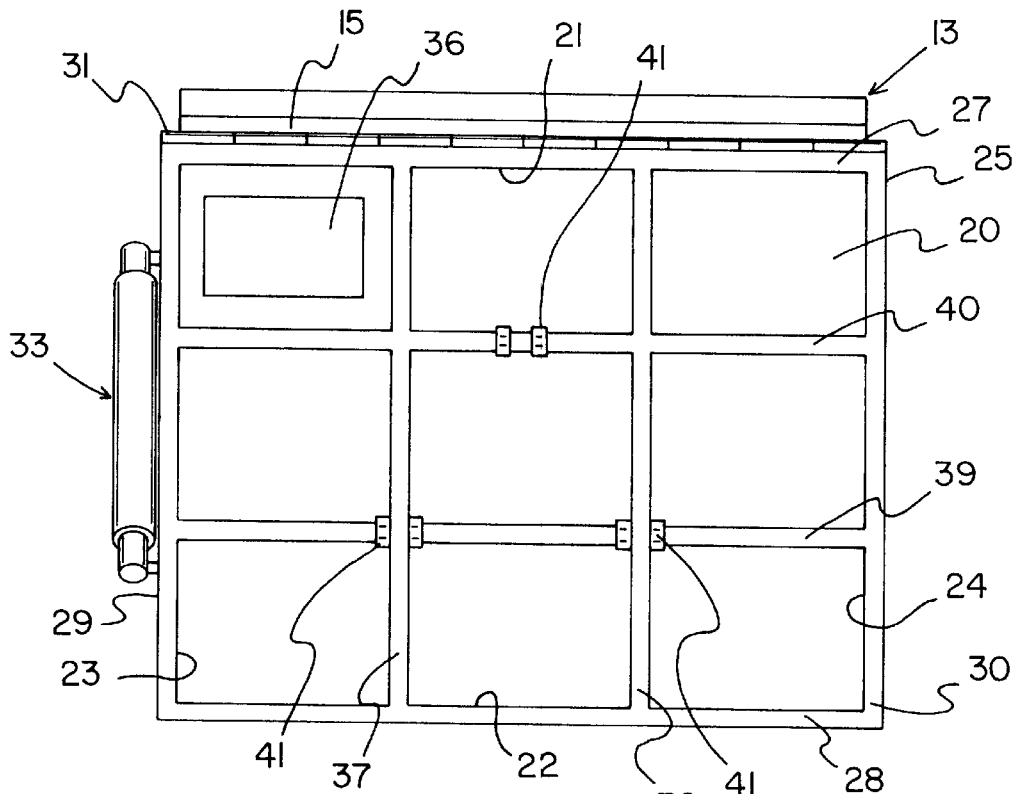
FIG. 3 is a schematic front side view of the front cover panel of the present invention.
Figure 4:
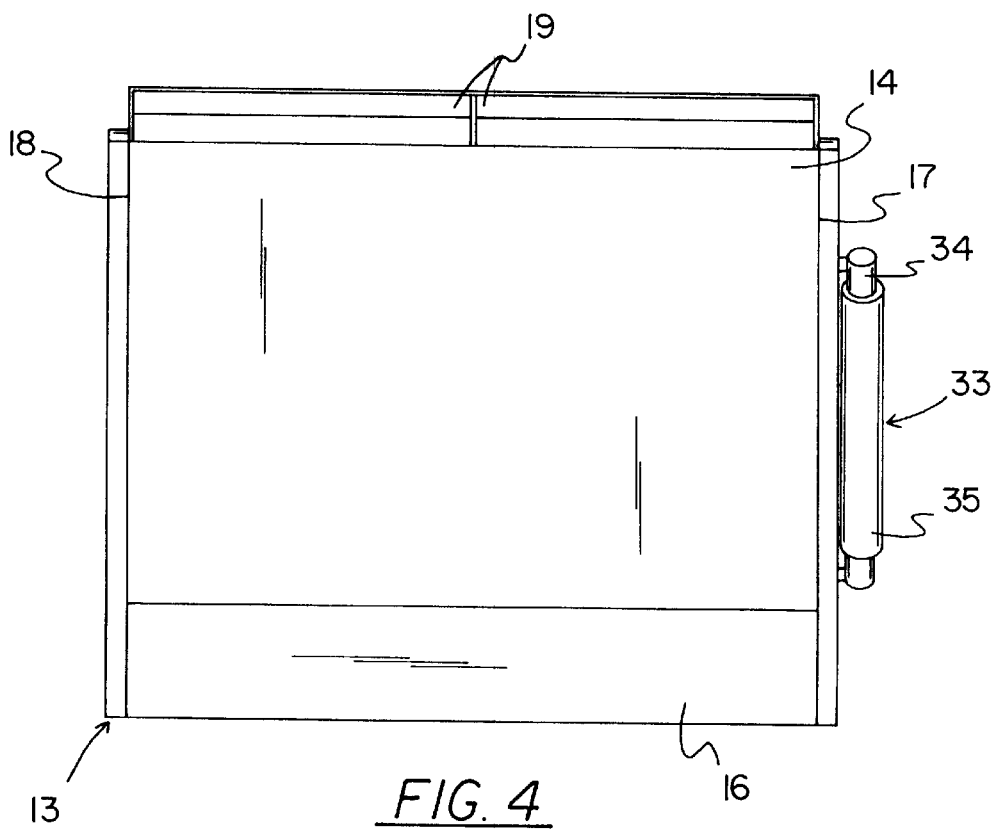
FIG. 4 is a schematic back side view of the container member of the present invention.

The support frame assembly permits the pivoting of the container member 13 with respect to the front cover panel 20 between a lowered closed position (FIG. 1) and an raised opened position (FIG. 2). The front cover panel 20 substantially covers the front opening of the container member 13 when in the closed position such that grass clippings may be kept in the interior space of the container member 13. A portion of the front edge of the container member 13 located along the bottom panel 16 of the container member 13 is spaced apart from the bottom edge 22 of the front cover panel 20 when in the opened position, the opened position permitting the dumping out of the contents (i.e., grass clippings) in the interior space of the container member 13.

The back frame 26 of the support frame assembly has a generally triangular support arm 32 coupled to one of the side bars 29,30 of the back frame 26. The support arm 32 is extended from the one side bar of the back frame 26 towards the back panel 14 of the container member 13.

A moving device is provided for selectively moving (that is raising and lowering) the container member 13 between the closed and opened positions. Preferably, the moving device comprises a fluidic piston-cylinder actuator 33 having a cylinder portion 35 and a piston portion 34 telescopically extendable from the cylinder portion 35. The piston portion 34 is pivotally coupled to the support arm 32 of the back frame 26 and the cylinder portion 35 is pivotally coupled to an adjacent side bar of the front frame 25. Preferably, the fluidic piston-cylinder actuator 33 includes a controller mountable to the riding lawn mower 11.

The front cover panel 20 has a passage hole 36 therethrough. The passage hole 36 is designed for extending one end of a grass chute 12 of a lawn mower 11 therein to permit passage of lawn clipping from the cutting blades of the lawn mover to the interior space of the container member 13. The passage hole 36 is generally rectangular and has a periphery has a pair of end portions and a pair of side portions extending between the end portions of the periphery of the passage hole 36. The passage hole 36 is positioned adjacent one of the upper corners of the front cover panel 20. Preferably, the side portions of the periphery of the passage hole 36 are generally parallel to the top and bottom edges 21,22 of the front cover panel 20 and the end portions of the passage hole 36 are generally parallel to side edges 23,24 of the front cover panel 20.

Ideally, the front frame 25 of the support frame assembly has a pair of spaced apart vertical cross bars 37,38 and a pair of spaced apart horizontal cross bars 39,40. The vertical cross bars 37,38 are extended between the top and bottom bars 27,28 of the front frame 25. The horizontal cross bars 39,40 are extended between the side bars 29,30 of the front frame 25 so that the vertical and horizontal cross bars are arranged in a grid-like fashion. The front frame 25 has a plurality of mounting brackets 41 adapted for mounting the front frame 25 to the back of a riding lawn mower 11. The mounting brackets 41 are provided on the cross bars of the front frame 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grass catcher for mounting to a riding lawn mower, said grass catcher comprising:

a container member having a rigid back panel, spaced apart rigid top and bottom panels and a pair of spaced apart rigid side panels;

said panels of said container member defining an interior space of said container member;

said container member having a front edge defining a front opening of said container member into said interior space of said container member;

a front cover panel for substantially covering said front opening of said container member, said front cover panel having top and bottom edges, a pair of side edges, a pair of upper corners and a pair of lower corners, said edges of said front cover panel defining an outer perimeter of said front cover panel;

a support frame assembly pivotally coupling said top panel of said container member to said top edge of said front cover panel, said support frame assembly having front and back frames;

said front frame of said support frame assembly being adapted for mounting to said lawn mower;

said front and back frames of said support frame assembly each having spaced apart top and bottom bars and a pair of spaced apart side bars extending between said top and bottom bars of said frames of said support frame assembly;

said front frame of said support frame assembly being coupled to said front cover panel such that said front frame extends around said outer perimeter of said front cover panel;

said back frame of said support frame assembly being coupled to said container member, said back frame being extended around said front edge of said container member;

said top bars of said front and back frames of said support frame assembly being pivotally coupled together;

said support frame assembly permitting pivoting of said container member with respect to said front cover panel between a closed position and an opened position;

wherein said front cover panel substantially covers said front opening of said container member when in said closed position, wherein a portion of said front edge of said container member located along said bottom panel of said container member is spaced apart from said bottom edge of said front cover panel when in said opened position; and said front cover panel having a passage hole therethrough, said passage hole being adapted for extending one end of a grass chute of a lawn mower therein to permit passage of lawn clipping from cutting blades of said lawn mover to the interior space of the container member;

wherein said top panel of said container member has a pair of vents providing openings into said interior space of said container member;

wherein said vents are positioned adjacent said back panel of said container member, said vents facing in a direction away from said front opening of said container member.

2. The grass catcher of claim 1, wherein said bottom panel of said container member lies in a first plane, and said back panel of said container member lies in a second plane, wherein said first plane of said bottom panel is extended at an obtuse angle to said second plane of said back panel.

3. The grass catcher of claim 2, wherein said obtuse angle is between about 120 degrees and about 150 degrees.

4. The grass catcher of claim 1, further comprising a moving device for selectively moving said container member between closed and opened positions.

5. The grass catcher of claim 4, wherein said back frame of said support frame assembly has a generally triangular support arm coupled to one of said side bars of said back frame, said support arm being extended from said one side bar of said back frame towards said back panel of said container member, and wherein said moving device comprising a fluidic piston-cylinder actuator having a cylinder portion and a piston portion telescopically extendable from said cylinder portion, said piston portion being pivotally coupled to said support arm of said back frame, said cylinder portion being pivotally coupled to an adjacent side bar of said front frame.

6. A grass catcher for mounting to a riding lawn mower, said grass catcher comprising:

a container member having a back panel, spaced apart top and bottom panels and a pair of spaced apart side panels;

said panels of said container member defining an interior space of said container member adapted for holding grass clippings therein;

said panels each being constructed from a rigid sheet metal material;

said container member having a front edge, said front edge of said container member being generally rectangular and defining a front opening of said container member into said interior space of said container member;

said top panel of said container member having a pair of vents providing openings into said interior space of said container, said vents being positioned adjacent said back panel of said container member, said vents facing in a direction away from said front opening of said container member;

said bottom panel of said container member lying in a first plane, said back panel of said container member lying in a second plane, said first plane of said bottom panel being extended at an obtuse angle to said second plane of said back panel, wherein said obtuse angle is between about 120 degrees and about 150 degrees;

a generally rectangular front cover panel for substantially covering said front opening of said container member, said front cover member having top and bottom edges, a pair of side edges, a pair of upper corners and a pair of lower corners, said edges of said front cover panel defining an outer perimeter of said front cover panel;

a support frame assembly pivotally coupling said top panel of said container member to said top edge of said front cover panel, said support frame assembly having generally rectangular front and back frames;

said front frame of said support frame assembly being adapted for mounting to a lawn mower;

said front and back frames of said support frame assembly each having spaced apart top and bottom bars and a pair of spaced apart side bars extending between said top and bottom bars of the associated frame of said support frame assembly;

said front frame of said support frame assembly being coupled to said front cover panel such that said front frame extends around said outer perimeter of said front cover panel;

said back frame of said support frame assembly being coupled to said container member, said back frame being extended around and positioned adjacent said front edge of said container member such that said front opening of said container member is positioned inside the perimeter of said back frame;

said top bars of said front and back frames of said support frame assembly being pivotally coupled together;

said support frame assembly permitting pivoting of said container member with respect to said front cover panel between a closed position and an opened position;

wherein said front cover panel substantially covers said front opening of said container member when in said closed position, wherein a portion of said front edge of said container member located along said bottom panel of said container member is spaced apart from said bottom edge of said front cover panel when in said opened position;

said back frame of said support frame assembly having a generally triangular support arm coupled to one of said side bars of said back frame, said support arm being extended from said one side bar of said back frame towards said back panel of said container member;

a moving device for selectively moving said container member between closed and opened positions;

wherein said moving device comprising a fluidic piston-cylinder actuator having a cylinder portion and a piston portion telescopically extendable from said cylinder portion, said piston portion being pivotally coupled to said support arm of said back frame, said cylinder portion being pivotally coupled to an adjacent side bar of said front frame;

said front cover panel having a passage hole therethrough, said passage hole being generally rectangular and having a periphery having a pair of end portions and a pair of side portions extending between said end portions of said periphery of said passage hole;

said passage hole being positioned adjacent one of said upper corners of said front cover panel, said side portions of said periphery of said passage hole being generally parallel to said top and bottom edges of said front cover panel, said end portions of said passage hole being generally parallel to side edges of said front cover panel;

wherein said front frame of said support frame assembly has a pair of spaced apart vertical cross bars and a pair of spaced apart horizontal cross bars, said vertical cross bars being extended between said top and bottom bars of said front frame, said horizontal cross bars being extended between said side bars of said front frame, said vertical and horizontal cross bars being arranged in a grid-like fashion; and said front frame having a plurality of mounting brackets adapted for mounting said front frame to a riding lawn mower, said mounting brackets being provided on said cross bars of said front frame.

* * * * *